United States Patent
Bell et al.

(10) Patent No.: US 9,530,258 B2
(45) Date of Patent: Dec. 27, 2016

(54) SYSTEM OF COMPONENTS WITH SENSORS AND METHOD FOR MONITORING THE SYSTEM OF COMPONENTS

(71) Applicants: Andrew Bell, Clevedon (GB); Michael Colton, Bristol (GB)

(72) Inventors: Andrew Bell, Clevedon (GB); Michael Colton, Bristol (GB)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/755,346

(22) Filed: Jun. 30, 2015

(65) Prior Publication Data
US 2016/0005244 A1    Jan. 7, 2016

(30) Foreign Application Priority Data
Jul. 1, 2014 (GB) .................................. 1411644.6

(51) Int. Cl.
*G07C 5/08* (2006.01)
*F16C 19/52* (2006.01)
*G01M 13/04* (2006.01)

(52) U.S. Cl.
CPC ............. *G07C 5/0841* (2013.01); *F16C 19/52* (2013.01); *G01M 13/04* (2013.01)

(58) Field of Classification Search
CPC ........ G07C 5/0841; G01M 13/04; F16C 19/52
USPC ......................................................... 701/29.1
See application file for complete search history.

(56) References Cited

U.S. PATENT DOCUMENTS

| 6,116,089 A | 9/2000 | El-Ibiary et al. |
| 2005/0246150 A1 | 11/2005 | Shiromaru et al. |

FOREIGN PATENT DOCUMENTS

| WO | 9811356 A1 | 3/1998 | |
| WO | WO 98/11356 | * 3/1998 | .............. F16C 32/00 |
| WO | 2013077795 A1 | 5/2013 | |
| WO | 2013160053 A1 | 10/2013 | |
| WO | 2013160061 A1 | 10/2013 | |

* cited by examiner

*Primary Examiner* — Brian P Sweeney
(74) *Attorney, Agent, or Firm* — Bryan Peckjian; SKF USA Inc. Patent Dept.

(57) ABSTRACT

A system comprising a plurality of components operating under essentially identical conditions, wherein each of the components is equipped with at least one sensor for measuring the same operating parameter for each of the components, and a monitoring unit configured to receive and process the signals of the sensors and to generate maintenance data based on the sensor signals. The monitoring unit is configured to calculate a parameter quantifying deviations between the measured operating parameters.

12 Claims, 3 Drawing Sheets

SYSTEM OF COMPONENTS WITH SENSORS AND METHOD FOR MONITORING THE SYSTEM OF COMPONENTS

CROSS REFERENCE TO RELATED APPLICATIONS

This is a Non-Provisional Patent Application, filed under the Paris Convention, claiming the benefit of Great Britain Patent (GB) Application Number 1411644.6 filed on 1 Jul. 2014 (01.07.2014), which is incorporated herein by reference in its entirety.

FIELD OF THE INVENTION

The invention relates to a system of components with sensors, in particular to a system of sensitized bearings, and to a method for monitoring the system of components.

BACKGROUND OF THE INVENTION

The problem of monitoring wear of system components in a more or less automated way has ever increasing importance in many fields of application. It is known to provide system components with sensors which can be read out for purposes of maintenance and for deciding whether a system component needs replacement or not.

This is of particular relevance in the field of bearings, because bearing failure may lead to important damages or system failures well beyond the damage of the bearing itself in many fields of application.

In these fields of application where system-relevant components are subject to wear and failure can lead to major damages, the maintenance schedule has to be such that the components are replaced well before the risk of failure starts to increase when approaching the end of the component lifetime. However, replacement may require system shutdown and may be quite expensive such that it is very important to define the replacement cycles in such a way that a good balance between reduction of risk of failure on the one hand and low system downtime and replacement or maintenance costs on the other hand is reached.

One example is a typical helicopter rotor control (self-lubricating) bearing. In the case of helicopter blade pitch, bearings are inspected by measurement of the clearance between the inner and outer ring.

Each bearing is measured individually to check for clearance evolution. This is almost always done with the bearing disassembled from the aircraft. This clearance is then used to estimate the remaining self-lubricating material (liner); the flight safety is maintained through tracking this clearance evolution at disassembly intervals, and pre-flight visual inspections.

This measurement can be inconsistent due to:
  contamination/liner debris;
  unequal wear from an offset reversing load (can result in premature bearing replacement as remaining liner thickness cannot be established);
  human error; and
  the usable lubricating material being relatively thin (~150 µm)

Dynamic measurements (e.g. strain, temperature) are rarely or not applied at all in this field of application. However, state of the art for bearing condition monitoring, if applied, would focus on bearing readings and comparison to expected readings from reference data gathered in calibration for the given combination of bearing and application. This method will typically require testing and calibration for each specific system and application. Calibration and wear prediction may be difficult or impossible in cases where the field of application, or its environment is rapidly changing in an unpredictable way. This is the case e.g. for aircraft components, which are used under widely varying environmental conditions.

Current solutions suffer from the drawbacks that the frequency of inspection intervals may be high, early product replacement may increase costs, whereas dynamic measurements of individual components may be difficult to calibrate.

BRIEF SUMMARY OF THE INVENTION

The invention seeks to solve the above problems for applications where a plurality of essentially identical components operate under essentially identical conditions.

The invention starts from a system comprising a plurality of essentially identical components operating under essentially identical conditions, wherein each of the components is equipped with at least one sensor for measuring the same operating parameter for each of the components, and a monitoring unit configured to receive and process the signals of the sensors and to generate maintenance data based on the sensor signals. In this context, the expression "essentially identical" refers to the identical expected wear and expected component lifetime and the components and the conditions may differ at least within the range of standard tolerances or in aspects without impact on the expected wear and expected component lifetime.

It is proposed that the monitoring unit is configured to calculate at least one difference between the operating parameters pertaining to at least one pair of components, and to use the difference for calculating a parameter quantifying deviations between the measured operating parameters.

The invention proposes sensor sing a number of similar components, e.g. pitch control bearings/rod ends, with e.g. temperature, load, sensing capability. Typical concerns, such as taking a temperature measurement as close to the component surfaces as possible, are much reduced. As long as the data gathered is primarily a function of the component condition, and location is consistent from part-to-part, the idea of the invention will work.

The invention compares the condition of multiple similar components to one another when situated within a system of which they experience similar operating conditions. Through this comparison it is possible to identify unusual component behavior which could trigger the need for inspection/replacement.

This invention eliminates the need to calibrate individual components, instead the components are calibrated to one another within the same system and benefit from the fact that statistically all component will not fail at the same time.

In a preferred embodiment of the invention, the parameter quantifying deviations between the measured operating parameters is a statistical parameter quantifying a width of a distribution of measurement values, in particular a standard deviation of the operating parameters. A high standard deviation may indicate that there is an outlier, e.g. one component with increasing temperature. In the absence of different operating or external conditions, this is a strong indicator for an approaching end of the component lifetime.

Further embodiments of the invention include parameters calculated from combinations of different sensor values obtained by different sensors or combinations of statistical values relating to different measurement values, e.g. a ratio between a standard deviation of component temperatures to a statistical parameter relating to acoustic measurements or the like. Any kind of meaningful parameter could be used.

The invention works by taking advantage of the population size of identical components operating in a system with identical conditions (helicopter due to multiple blades). This allows the component response to be compared relative to the other components in the same system, therefore allowing relative, rather than absolute measurements to identify failing components.

It is further proposed that the monitoring unit is configured to compare the parameter with a threshold value and to generate a signal indicating that one of the components requires replacement if the parameter exceeds the threshold value. The signal can be an optical or acoustical signal (e.g. an LED) or can be transmitted to a remote computer configured to use the signal in the definition of a maintenance schedule.

According to an aspect of the invention, the monitoring unit is configured to transmit the parameter to a stock control unit configured to determine a number of components for replacement to be kept in a stock.

According to a further aspect of the invention, the monitoring unit is configured to transmit the parameter to a returned part analysis unit configured to analyze possible reasons for component failure.

It is further proposed that the at least one sensor is formed as at least one of a vibration sensor, a strain sensor, an acoustics sensor, an acceleration sensor or a capacitance sensor.

In a preferred embodiment of the invention, the components are self-lubricating plain bearings. In this case, the failure of the self-lubricating function is difficult to monitor in a direct way.

According to yet another aspect of the invention, the components are provided with energy harvesting means for generating energy from relative movements between the component and other parts, e.g. strain or temperature variation in bearing housing. This enables a continuous and autonomous operation of the sensors.

It is further proposed that the components and the monitoring unit are configured to communicate in a wireless network.

The invention leads to very advantageous effects in particular in an aircraft including a system of components as described above, in particular in the case where the components are rotor pitch control bearings of a helicopter. This application is particularly well suited for the following reasons:
  multiple identical bearings;
  all bearings experience the same duty cycle;
  all bearings experience the same environmental conditions;
  the bearings are flight critical and have relatively rapid end of life wear rates;
  inspection is expensive;
  frequent oscillating loads and temperature variation make energy harvesting a viable method of powering signal generators and wireless transmitters. However, this patent could apply to any system in which a quantity of components are used under similar operating conditions A further aspect of the invention relates to a method for monitoring a system of components operating under essentially identical conditions, wherein each of the components is equipped with at least one sensor for measuring the same operating parameter for each of the components, the method comprising the steps of to receiving and processing the signals of the sensors and of generating maintenance data based on the sensor signals.

It is proposed that the method further comprises the step of calculating a parameter quantifying deviations between the measured operating parameters using the sensor signals and/or by calculating a difference between at least two of the sensor signals pertaining to different components.

The proposed concept suggests that rather than compare component readings to reference data/expectations, instead the data is processed, and the components are compared to each other, preferably using statistical methods, in order to spot an outlier, or statistically significant difference within the group of similar components.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
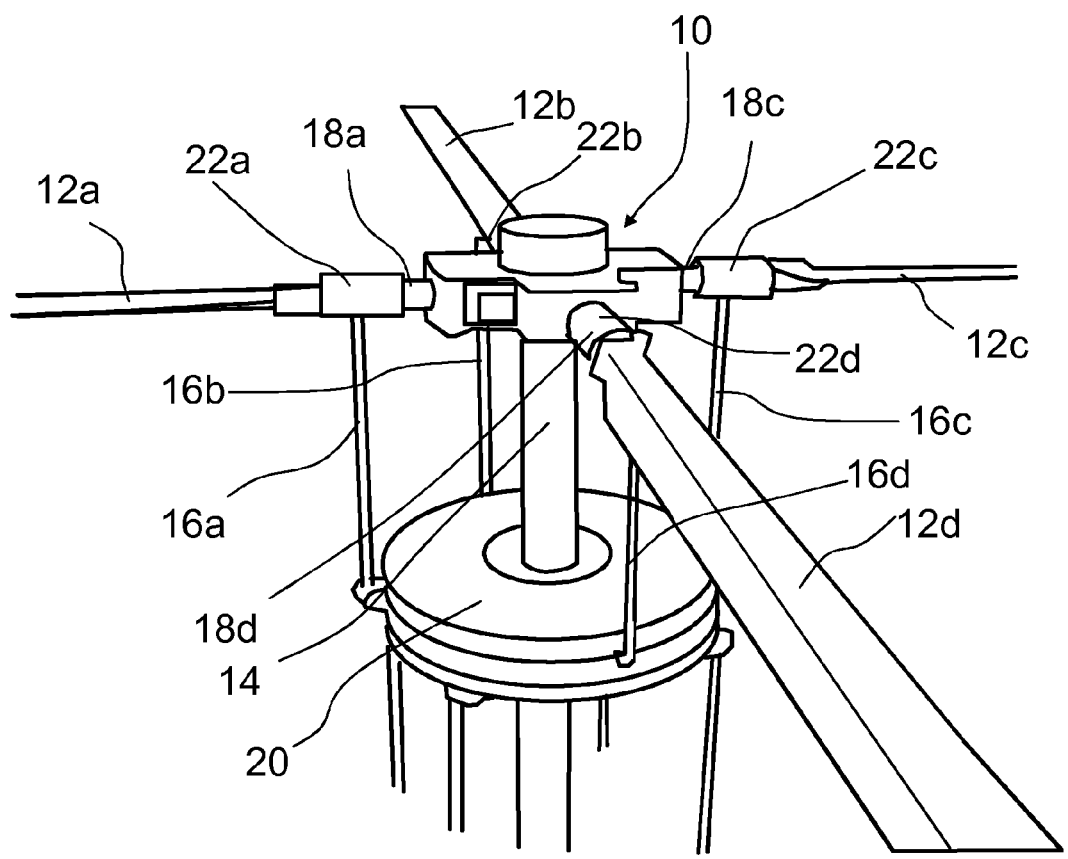
FIG. 1 is a schematic representation of a rotor of a helicopter.

FIG. 1 is a schematic representation of a rotor 10 of a helicopter having 4 rotor blades 12a-12d. The blades 12a-12d are attached to a rotor mast 14 in a fully articulated fashion and the collective as well as the individual rotor pitch can be adjusted using pitch control rods 16a-16d connecting a blade grip 18a-18d with an upper swash plate 20.

The upper and lower ends of the pitch control rods 16a-16d are connected to their respective counterparts by means of components formed as pitch control bearings 22a-22d, which are formed as self-lubricating plain bearings 22a-22d and which are identical for the four rotor blades 12a-12d.

Figure 2:
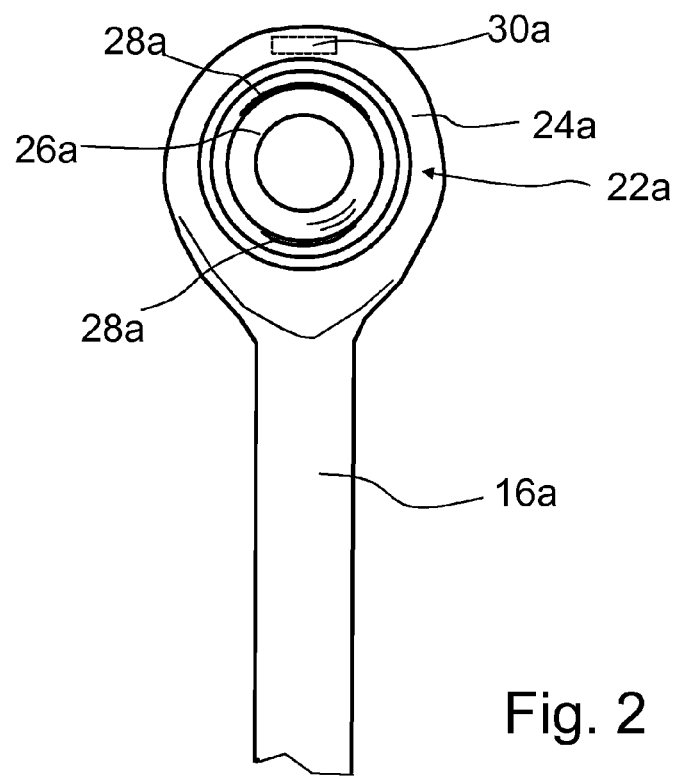
FIG. 2 is a pitch control bearing of the rotor according to FIG. 1.

One of the pitch control bearings 22a is illustrated in FIG. 2. The pitch control rod 16a is provided with a bearing outer ring 24a at its upper end and the blade grip 18a is provided with a ball joint 26a interacting with dome-shaped concave inner surfaces of the outer ring 24a. A liner 28a containing lubricant is provided between the ball joint 26a and the outer ring 24a. The liner 28a is subject to wear and has to be replaced (or the entire bearing is replaced) when it is worn or when the lubricant is used up. The pitch control rods 16a-16d transmit oscillating vertical loads on between the upper swash plate 20 and the blade grips 18a-18d such that the main wear regions are located on the vertically upper and lower ends of the bearing rings 24a.

According to the invention, the outer rings of the bearings 22a-22d are equipped with sensors 30a-30d, wherein one temperature sensor per bearing is used in this embodiment for illustrative purposes.

Figure 3:
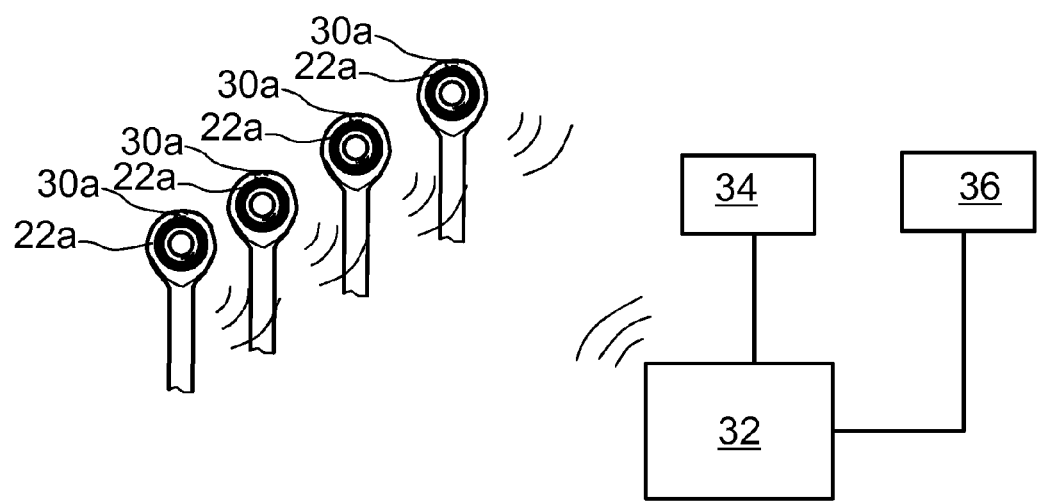
FIG. 3 is a system according to the invention including four components, and a monitoring unit.

FIG. 3 illustrates a system according to the invention, which comprises four bearings 22a-22d as components to be monitored and one monitoring unit 32 arranged in the cockpit of the helicopter. The sensors 30a-30d are arranged in sensor housings having an energy harvester harvesting energy from the oscillations of the rotor blades within the bearing ring and with a wireless transmitter sending the sensor data to the monitoring unit 32, which keeps track of the temperature evolution of the individual bearings 22a-22d. The monitoring unit 32 is provided with a receiver receiving the signals of the wireless transmitters of the sensors 30a-30d such that the system components 22a-22d communicate in a wireless network.

According to the invention, the monitoring unit 32 is further configured to receive and process the signals of the sensors 30a-30d and to generate maintenance data based on the sensor signals, in particular to calculate the standard deviation $\sigma$ of the measurement values as a parameter quantifying deviations between the measured operating parameters using the sensor signals. As already noted earlier, it is possible to use other statistical parameters such as the variance or to calculate the at least one parameter based on measurement values obtained from multiple sensors 30a-30d measuring different operating parameters of the components 22a-22d respectively.

The monitoring unit 32 is configured to compare the parameter with a threshold value and to generate a signal indicating that one of the components 22a-22d requires replacement if the parameter exceeds the threshold value. The signal is sent to the bearing user indicating the bearing which requires maintenance. This could be in the form of an in-flight alert or a post flight maintenance code etc.

As an alternative or in addition to the notification of the bearing user, the signal or a data package including the parameter may then be transmitted to a stock control unit 34 configured to determine a number of components 22a-22d for replacement to be kept in a stock and to a returned part analysis unit 36 configured to analyze possible reasons for component failure. In the case of asset management (stock control), bearing users maintain stock based on estimated bearing life and average flight hrs. The system according to the invention could improve the data used for bearing life. This is particularly useful when aircrafts are flown in aggressive environments and bearing wear rate unexpectedly increases.

For returned part analysis, manufacturers are required to inspect a bearing returned by the user often with little flight data. Obviously the information on the evolution of the population statistics is very valuable for product analysis and improvement.

As an alternative and/or in addition to the temperature sensor 30, the bearing may be equipped with a vibration sensor, a strain sensor, an acoustics sensor, an acceleration sensor or a capacitance sensor.

Accordingly, the system of FIG. 3 implements a method for monitoring a system of essentially identical components 22a-22d operating under essentially identical conditions, wherein the method has a step of calculating a parameter quantifying deviations between the measured operating parameters using the sensor signals.

Alternatively, the invention could be applied to the measurement of e.g. 6 worn bearings 22a-22d in the same airframe system. The measurement is a relative measurement such that no calibration data about the 'new' bearing is necessary. One of the ideas is that six worn bearings 22a-22d in the same steady-state operating conditions should give the same response to some parameters, e.g. temperature. The invention exploits the relativity at the system level, rather than at the bearing level, and takes advantage of the fact that statistically, the likelihood of all similar rotor bearings 22a-22d assembled to an airframe failing simultaneously, is very low.

Figure 4:
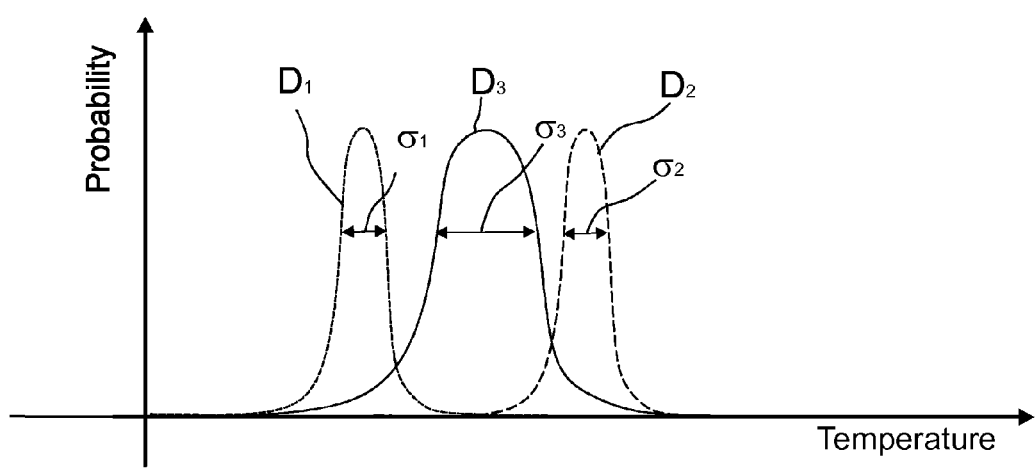
FIG. 4 is a graph showing distributions of components temperatures for three different cases.

FIG. 4 shows illustrates the distribution of component temperatures as an example for an operating parameter in a system according to the invention. The dashed lines indicate normal distribution D1 and D2 with standard deviations $\sigma 1$ and $\sigma 2$ for low external temperature and for high external temperature. As shown in FIG. 4, the average value of the normal distribution changes due to flying conditions, sunshine, snow, altitude etc. but all the bearings 22a-22d react the same as they are all in the same environment.

The solid line indicates the distribution D3 with a standard deviation $\sigma 3$ of operating parameters when the end of the lifetime of the components 22a-22d approaches. The components 22a-22d are worn out to a different degree such that the width of the distribution, i.e. the standard deviation $\sigma$ of the population, increases over time in a more or less continuous and monotonous way, the amplitude of eventual random oscillations being much smaller than those of e.g. average values. An increase beyond a predetermined threshold or an increase with a gradient larger than a limit value would indicate one of the parts has an issue, irrelevant of environment.

State of the art solutions require specific calibration for the bearing design, application or airframe. In contrast, the proposed method is based upon comparison of similar products in a given application. As a consequence, the extensive period of data gathering and/or calibration can be reduced or removed entirely. It is conceivable that a system could be fitted and used in application with no data gathering necessary to set system limits. The only calibration required is selection of the significance boundary—e.g. standard deviation $\sigma$ allowable in the population.

Environmental conditions in-application vary, making setting of system parameters with state of the art methods difficult, or for some concepts, not possible at all. With the proposed system and method, this problem is removed. For example, it is well known that an increase in bearing temperature is present at the end-of-life of a bearing. However due to different environmental or flying conditions, the expected steady-state temperature of a good bearing can vary. Because of this, setting absolute temperature criteria for rejection is difficult or not possible at all. Through using relative measurement between multiple bearings 22a-22d in the same environment/operating condition, part-to-part variation can be measured and any statistically significant difference can be reported as an impending bearing failure.

The invention claimed is:
1. A vehicle comprising:
the vehicle having a plurality of essentially identical bearings disposed thereon, each of the essentially identical bearings further comprising:
an outer ring;
a sensor for measuring a bearing operation condition, the sensor configured to transmit a bearing measurement signal associated with the bearing operation condition;
a processor disposed in the vehicle that is configured to receive the bearing measurement signals of the sensor in each of the plurality of essentially identical bearings,
wherein the processor is configured to use the bearing operation signals in each of the plurality of essentially identical bearings to calculate a standard deviation of the bearing operation conditions measured in all of the plurality of essentially identical bearings such that the standard deviation is related to a variance of the bearing operation conditions measured in all of the plurality of essentially identical bearings at the same point in time, and wherein the processor is further configured to compare the standard deviation to a threshold value, if the standard deviation is greater than the threshold value then the processor is configured to generate a maintenance alert.

2. The vehicle according to claim 1, wherein the maintenance alert is a signal indicating that one of the plurality of essentially identical bearings needs replacement.

3. The vehicle according to claim 2, wherein the processor is further configured to determine which one of the plurality of essentially identical bearings needs replacement.

4. The vehicle according to claim 1, wherein the sensor in each of the plurality of essentially identical bearings is further configured to continuously measure the bearing operation condition in real-time, and wherein the sensor in each of the plurality of essentially identical bearings continuously transmits the bearing measurement signal associated with the bearing operation condition.

5. The vehicle according to claim 4, wherein the processor is further configured to continuously in real-time calculate the standard deviation.

6. The vehicle according to claim 1, wherein the sensor is one of a vibration sensor, a strain sensor, an acoustics sensor, an acceleration sensor and a capacitance sensor.

7. The vehicle according to claim 1, wherein the plurality of essentially identical bearings are self-lubricating plain bearings.

8. The vehicle according to claim 1, wherein the plurality of essentially identical bearings are rotor pitch control bearings of a helicopter.

9. The vehicle according to claim 1, wherein the plurality of essentially identical bearings and the processor are configured to communicate in a wireless network.

10. The vehicle according to claim 1, wherein the plurality of essentially identical bearings are integrated into an aircraft.

11. A method of determining whether one of a plurality of bearings needs replacement, the method comprising the steps of:

providing a vehicle having the plurality of bearings disposed thereon, each of the plurality of bearings being essentially identical to each other, each of the plurality of bearings comprising an outer ring and a sensor configured to continuously measure a bearing operation condition in real-time;

operating the vehicle for a period of time;

during the period of time of operation of the vehicle, continuously measuring the bearing operation condition by the sensor in each of the plurality of bearings;

during the period of time of operation of the vehicle, continuously transmitting, by the sensor in each of the plurality of bearings, a bearing measurement signal associated with the bearing operation condition;

providing a processor in the vehicle that is configured to continuously receive the bearing measurement signal from each of the plurality of bearings, the processor configured to activate the maintenance light;

the processor in real time continuously transforming the bearing measurement signal from all of the plurality of bearings into a single real time standard deviation associated with the bearing operation conditions of the plurality of bearings at that time;

continuously comparing by the processor the single real time standard deviation to a threshold value such that serviceability of the plurality of bearings can be monitored while the vehicle is undergoing a particular vehicle operating condition without requiring that prior data for acceptable bearing operation conditions when exposed to the particular vehicle operating condition is available for comparison by the processor;

activating a maintenance alert within the vehicle by the processor if the single real time standard deviation is greater than the threshold value to signal that one of the plurality of bearings needs replacing and/or maintenance.

12. The method of claim 11, wherein the step of providing the vehicle further comprises the vehicle having a maintenance light which is activated by the maintenance alert.

* * * * *